United States Patent [19]

Skarstad

[11] 4,210,706

[45] Jul. 1, 1980

[54] CATHODE MATERIALS FOR ELECTROCHEMICAL CELLS

[75] Inventor: Paul M. Skarstad, Wayzata, Minn.

[73] Assignee: Medtronic, Inc., Minneapolis, Minn.

[21] Appl. No.: 34,266

[22] Filed: Apr. 30, 1979

[51] Int. Cl.² ........................ H01M 4/36; H01M 6/18
[52] U.S. Cl. ..................................... 429/105; 429/213
[58] Field of Search .............. 429/213, 105, 212, 191, 429/192, 101, 199; 252/500, 510, 511

[56] References Cited

U.S. PATENT DOCUMENTS

| | | | |
|---|---|---|---|
| 3,185,590 | 5/1965 | Mayer et al. | 429/213 X |
| 3,423,242 | 1/1969 | Meyers et al. | 429/194 |
| 3,438,813 | 4/1969 | Davis | 429/213 |
| 3,582,404 | 6/1971 | Blackburne et al. | 429/194 X |
| 3,660,163 | 5/1972 | Moser | 429/213 X |
| 3,660,164 | 5/1972 | Hermann et al. | 429/213 X |
| 3,969,143 | 7/1976 | Mead et al. | |
| 4,010,043 | 3/1977 | Schneider | 29/523.2 |

Primary Examiner—Anthony Skapars
Attorney, Agent, or Firm—Schroeder, Siegfried, Ryan, Vidas, Steffey & Arrett

[57] ABSTRACT

Novel cathode materials for use in electrochemical cells. The cathode materials consist essentially of a conductive saturated solution comprised of iodine dissolved in an organic component selected from certain pyridine derivatives, as set forth herein. Preferably, the cathode materials further include, in addition to the saturated solution or liquid phase, an iodine solid phase. Large amounts of the solid phase, relative to the liquid phase, may be used.

8 Claims, 3 Drawing Figures

CATHODE MATERIALS FOR ELECTROCHEMICAL CELLS

DESCRIPTION

1. Background of Prior Art

The invention relates generally to electrochemical cells, batteries in particular, and improved cathode materials therefor. More specifically, it relates to cells which incorporate the improved cathode materials described herein for use in implantation in the human body to operate electrical devices such as cardiac pacemakers and the like.

2. Brief Summary of the Invention

The invention is not directed to any particular cell or battery design but rather to a new group of cathode materials as described herein for use in combination with any electrochemical cell design or structural arrangement. In physical arrangement, it is only required that anode and a cathode means of the cell, including the cathode material of the invention, be placed in operative relationship with each other, in the broadest sense.

The cathode materials of the invention are conductive single phase liquids comprising in combination an organic component which is capable of forming a saturated liquid solution with dissolved iodine at normal human body temperature i.e., about 37° C. The materials may also comprise two phase liquid-solid compositions in which the liquid phase is the saturated solution already described and the solid phase is additional iodine. The organic component is selected from the pyridine derivatives: dimeric pyridine, monomeric substituted pyridines, dimeric substituted pyridines, monomeric quinoline, monomeric substituted quinolines, trimeric pyridines, and mixtures thereof.

The cathode materials of the invention are conductive due to the highly conductive liquid phase. The conductivity of the liquid phase is typically on the order of about $10^{-2}(ohm-cm)^{-1}$. The relative proportions of organic component and iodine in the saturated solution will be at least about three moles of iodine to each mole of pyridine rings in the organic component. Any amount of excess solid phase iodine i.e., greater than the amount necessary to form the saturated solution of the liquid phase may be used to form the two phase material so long as the resultant material retains sufficient conductivity for its intended purpose. For example, in a high capacity cell intended for use with long-term, low-drain, medical devices, the amount of excess iodine found satisfactory has been 20–40:1 moles of iodine per mole of pyridine rings in the organic component and higher.

DETAILED DESCRIPTION OF THE INVENTION

Figure 1:
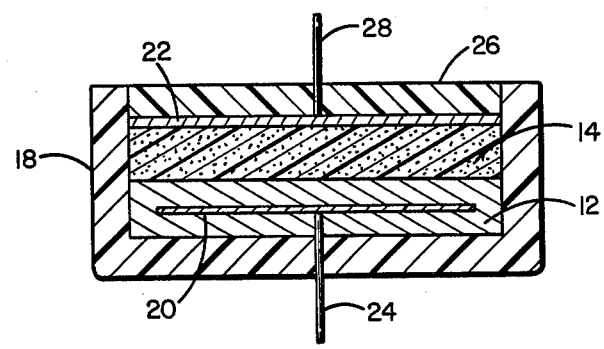
FIGS. 1 and 2 comprise schematic showings of typical electrochemical cells utilizing cathode materials of the invention.

FIG. 1 comprises an electrochemical cell battery having a lithium anode 12 and a two-phase, liquid-solid cathode 14, according to the invention, contacting anode 12. The anode and cathode are disposed within an electrically insulating housing 18 and cover 26. The anode and cathode are respectively contacted by current collectors 20 and 22, which may for example be Hastelloy C and platinum, respectively. Other materials may be used as are known in this art e.g., zirconium for the anode collector and nickel for the cathode collector. Current collectors 20 and 22 preferably take the form of a mesh or screen. Attached to current collectors 20 and 22, as by welding, are electrical leads 24 and 28, respectively. The electrical leads are sealed where they pass through housing 18 and cover 26 as by molding them into the housing and cover or by using an adhesive. Ultrasonic welding is also used to seal cover 26 to housing 18 and the unit may then be potted or placed in a sealed stainless steel container (not shown) or the like.

Housing 18 and cover 26 may be of Halar, a trademark of the Allied Chemical Company. It is a proprietary fluropolymer material. On the other hand, the housing and cover may be of any insulative material not substantially reactive with the cell components to be contained therein.

While lithium is the preferred anode material for use with the invention and is disclosed in the specific examples set forth herein, lithium-rich alloys such as lithium-magnesium, silver, and other anode metals which form conductive iodides may also be used.

Figure 2:
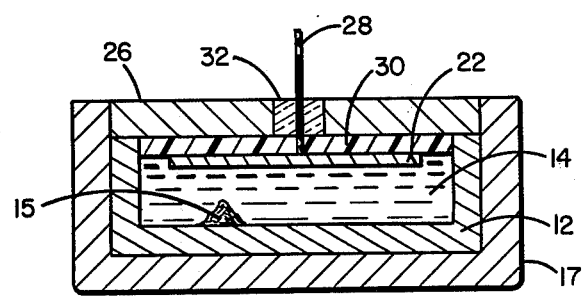

FIG. 2 comprises an electrochemical cell having a lithium anode 12 and a two phase liquid-solid cathode (14 indicating the liquid phase and 15 indicating the solid iodine phase schematically). Solid phase 15 may be omitted to provide only the single liquid phase 14 i.e., the iodine saturated solution. Lithium anode 12 is cup-shaped and nests in a metal container 17, made for example of stainless steel, with which it is in electrical contact so that electrical contact may be made to the anode by contacting housing cup 17 which functions as an anode current collector. Cathode 14 is contacted by a current collector 22 of Hastelloy C, platinum or the like. Stainless steel cover 26 is welded to housing 17 and contacts lithium anode 12 as shown. Cover 26 is insulated from cathode current collector 22 by an insulating body 30 which is non-reactive with the cell components. For example, a plastic such as the aforementioned Halar fluoropolymer may be used. An electrical lead 28 is attached to collector 22 and is insulated from cover 26 by means of a glass feedthrough 32.

In practice, various cell designs and component materials may be used with the cathode materials of the invention, the cells of FIGS. 1 and 2 merely being illustrative of two types of cells and combinations of materials. Materials for the cell components may be selected from any number of a wide variety of conventional materials known in the electrochemical art, particularly in the battery art.

Figure 3:
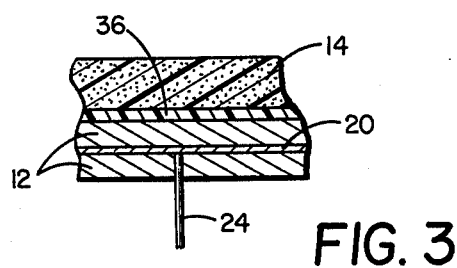
FIG. 3 is a fragmentary showing of a portion of FIG. 1 showing a modification which may be used with the invention.

FIG. 3 shows a modification of the cell structure of FIG. 1 which is used in more preferred embodiments. The cell includes a body or film 36 of poly-2-vinylpyridine polymer carried on the operative surface of anode 12, the operative surface being that surface which normally contacts the cell cathode, at least initially, for interaction therewith. Such an arrangement is more particularly described in applicants' co-pending application Ser. No. 885,514 and in U.S. Pat. Nos. 4,071,662; 3,957,533; and 3,957,635.

Cells of the type described herein require no electrolyte as initially constructed. Consequently, no electrolyte per se is shown in the Figures. However, following assembly, an electrolyte does form in situ. The electrolyte builds up between the cathode and the anode, usually taking the form of a layer, due to the reaction between the anode metal and the iodine in the liquid phase of the cathode material. For example, in a cell having a lithium anode, lithium iodide electrolyte will form on the anode during cell operation.

In accordance with one form of the invention, then, iodine and a selected organic component, specifically a pyridine derivative, and iodine are mixed directly together in at least about a 3:1 mole ratio of iodine per pyridine rings in the organic component, to form a saturated conductive solution, as is schematically shown at 14 in FIG. 2. As shown by way of example in Table 1, saturated solutions of iodine in the pyridine derivatives of the group set forth by the invention require at least about three moles or more of iodine per mole of pyridine rings in the organic component to form the conductive saturated solutions of the invention.

TABLE 1

Examples of saturated solutions of Organic + $I_2$ (mole ratios)

| Organic Component | Moles $I_2$/Mole of Pyridine Rings in the Component |
|---|---|
| 2-ethylpyridine | 4.0 |
| 2-vinylpyridine | 2.75-3.3 |
| 2-methoxypyridine | 3.8 |
| 2-dimethylaminopyridine | 3.9 |
| 2,6-diaminopyridine | 4.0 |
| 4-ethylpyridine | 3.8 |
| Quinaldine (2-methylquinoline) | 4.0 |

As already pointed out, the presence of a solid phase of iodine in the saturated solution, as at 15 in FIG. 2 and at 14 in FIG. 1, in addition to the iodine dissolved in the saturated solution may preferably be used to form the cathode materials of the invention. That is, additional amounts of iodine in excess of the saturated solution amounts are preferably used. The primary purpose of utilizing additional amounts of iodine, over and above those amounts needed to form saturated solutions, is to increase the capacity of the cell in which the cathode material is used. For this reason, the two phase or liquid-solid phase form of the invention is most preferred. In such an instance, the solid phase acts as an iodine reservoir for the cathode material during cell operation.

The upper limit on the amount of solid phase iodine which can be used relative to the amount of organic component in the liquid phase is that amount of iodine which will cause the conductivity of the composite material to be lower than that required for any particular intended use. That value will depend on the specific organic component, the particular cell design and its particular application. It can be seen, however, that the addition of more and more iodine to the liquid phase, say over the excess amount indicated as 15 shown in FIG. 2, will eventually cause the material to assume a paste-like appearance as shown schematically in FIG. 1 and to ultimately assume a granular appearance, beyond which point the liquid phase becomes so dispersed among the solid iodine particles that its conductivity becomes too low for most cell applications, such as below about $10^{-5}(ohm-cm)^{-1}$.

Iodine, being a particulate material, may be used in either a coarse particle form or a finely divided particle form, such as iodine which has been milled to a powder. It is preferred that finely divided iodine, such as that uniform particulate which is obtained by the electric milling of iodine, be used in cells of this invention. Finely divided iodine allows for accelerated testing to evaluate the complete discharge characteristics of the cells because of the ready dissolution of finely divided iodine in the cathode liquid phase due to its high surface area. Thus, the more finely divided, the better.

Iodine and certain amounts of organic components not of the invention, depending on the specific organic component used, will form a solid-appearing cathode material, either initially or upon setting for a time. For example, when iodine is mixed with pyridine (a liquid at room temperature) in a mole ratio of 5:1, the resultant cathode material has the appearance of a solid but is in fact a two phase material, both phases being solid. However, it is poorly conductive because it lacks a liquid phase. On the other hand, if iodine is mixed with any of the organic components of the invention, such as 2-ethylpyridine in the same ratio, a two-phase mixture results, one phase being a liquid phase saturated solution, the other phase being solid iodine.

Larger amounts of iodine relative to 2-ethylpyridine and the like, such as a 37:1 mole ratio, produce a two-phase paste-like liquid-solid cathode material having a conductivity of $2.5 \times 10^{-5} (ohm-cm)^{-1}$. When incorporated into a cell having a lithium anode with an area of 5.0 cm$^2$, such a cell produced an initial open circuit voltage (OCV) of 2.524 volts and a 100 Kohm load voltage of 2,506. Later OCV for the cell was 2.80 volts. The cell produced a current of $2.5 \times 10^{-5}$ amps.

Heat may be applied to the mixture in forming the cathode material although it is not ordinarily necessary for most combinations. Care should be taken, with all of the materials described herein to protect them against the presence of significant amounts of moisture. This may be accomplished by preparing and maintaining various cell components including the cathode materials in a dry box having an atmosphere such as dried helium or in a dry room.

The organic component of the cathode material, as initially combined with the iodine component, must be selected from the group consisting of the following pyridine derivatives: dimeric pyridines (such as 2,2'-dipyridyl and 2,2'-dipyridylamine), monomeric substituted pyridines (such as those listed in Table 2 below), dimeric substituted pyridines (such as 1,2-bis(4 pyridyl)-1,2-ethanediol and 1,2-bis (4 pyridyl)ethane), monomeric quinoline, monomeric substituted quinolines (such as those listed in Table 2 below), trimeric substituted pyridines (such as trimer sym-tri(4 pyridyl)cyclohexane) and mixtures of the foregoing.

Table 2 lists the initial operating characteristics for several electrochemical cells prepared with various selected organic components and iodine to form cathode materials in accordance with the invention. Lithium anodes are used in these cells.

TABLE 2

Li/I$_2$-Organic Donor Cells
INITIAL DISCHARGE AND ELECTRICAL CHARACTERISTICS

| Organic Components | Type | Moles iodine per mole of pyridine rings in organic Component | OCV* | 100 Kohm Load Voltage | 10 Kohm Load Voltage | OCV After 17 days on 10 Kohm load |
|---|---|---|---|---|---|---|
| (Anode Area = 5.0 cm$^2$) | | | | | | |
| 2-ethyl-pyridine | Substituted pyridine | 6.3 | 2.560 / 2.568 | 2.591 / 2.612 | 2.227 / 2.273 | 2.794 / 2.796 |
| 4-ethyl-pyridine | Substituted pyridine | 6.3 | 2.615 / 2.570 | 2.586 / 2.508 | 2.084 / 1.871 | 2.787 / 2.796 |
| 2-methoxy-pyridine | Substituted pyridine | 6.3 | 2.392 | 2.309 | 1.934 | 2.805 |
| 2-amino-pyridine | Substituted pyridine | 6.3 | 2.502 | 2.181 | 1.528 | 2.787 |
| 2-dimethyl-laminopyridine | Substituted pyridine | 6.3 | 2.767 / 2.726 | 2.695 / 2.749 | 2.266 / 2.448 | 2.780 / 2.791 |
| quinoline | — | 6.3 | 2.797 / 2.796 | 2.763 / 2.756 | 2.484 / 2.427 | 2.793 / 2.796 |
| 2-methyl-quinoline | Substituted quinoline | 6.3 | 2.669 / 2.484 | 2.702 / 2.476 | 2.328 / 1.598 | 2.801 / 2.801 |
| 4-methyl-quinoline | Substituted quinoline | 6.3 | 2.753 | 2.700 | 2.501 | 2.789 |
| (Anode Area = 0.63 cm$^2$) | | | | | | |
| 2-methyl-pyridine | Substituted pyridine | 20. | 2.718 | 2.053 | | |
| 3-methyl-pyridine | Substituted pyridine | 20. | 2.671 | 2.156 | | |
| 4-methyl-pyridine | Substituted pyridine | 20. | 2.587 | 2.550 | | |
| 2-ethyl-pyridine | Substituted pyridine | 20. | 2.573 | 1.026 | | |
| 4-ethyl-pyridine | Substituted pyridine | 20. | 2.803 | 0.876 | | |
| 2-vinyl-pyridine | Substituted pyridine | 20. | 2.750 | 2.746 | | |
| 4-vinyl-pyridine | Substituted pyridine | 20. | 2.805 | 1.812 | | |
| 2-chloro-pyridine | Substituted pyridine | 20. | 2.803 | 2.707 | | |
| 3-chloro-pyridine | Substituted pyridine | 20. | 2.803 | 2.525 | | |
| quinoline | " | 20. | 2.502 | 1.304 | | |
| 2-methyl-quinoline | Substituted Quinoline | 20. | 2.670 | 2.553 | | |
| 4-methyl-quinoline | Substituted quinoline | 20. | 2.834 | 1.930 | | |

*values less than 2.80 Volts indicate a short circuit or competitive reaction reducing the iodine activity.

Table 3 includes organic components, which are exemplary of those shown in Table 2, demonstrating among other things, the percent utilization of the iodine in the cathode material.

TABLE 3

Li/I$_2$ Organic Donor Cells
(anode area = 5.0 cm$^2$)
COMPLETE DISCHARGE

| Capacity (milliampere-hours) | Organic Component | Preparation Procedure | OCV (volts) | % utilization (to 400 millivolts under 10 Kohm load) |
|---|---|---|---|---|
| .207 | 2-vinyl- | 3.75:1 mole | 2.80 | 75% |

TABLE 3-continued

Li/I₂ Organic Donor Cells
(anode area = 5.0 cm²)
COMPLETE DISCHARGE

| Capacity (milli-ampere-hours) | Organic Component | Preparation Procedure | OCV (volts) | % utilization (to 400 milli-volts under 10 Kohm load) |
|---|---|---|---|---|
| | pyridine | ratio mixture with I₂ heated at 80° C. for 24 hours. Liquid sample taken and mixed with finely powdered iodine (20:1 on mole basis). Packed on anode. | | |
| | | Same except prepared at 300° C. | 2.80 | 87% |
| | 2-ethyl-pyridine | Same as 80° C. preparation above. | 2.80 | 78% |
| | | Same as 300° C. preparation above. | 2.80 | 89% |

Having described the invention, the exclusive property rights claimed are defined as follows:

1. As a cathode material for electrochemical cells, a combination consisting essentially of a conductive saturated liquid solution comprising two initial components and any reaction product thereof, one of the initial components being an organic compound selected from the group of pyridine derivatives consisting of dimeric pyridine, monomeric substituted pyridines, dimeric substituted pyridines, monomeric quinoline, monomeric substituted quinolines, trimeric substituted pyridines, and mixtures thereof, and the other initial component being iodine dissolved therein.

2. The cathode of claim 1 wherein an iodine solid phase is included with the saturated solution.

3. The cathode material of claim 1 or 2 wherein the molar ratio of iodine to pyridine rings in the organic compound in the saturated solution is on the order of at least about 3:1.

4. The cathode material of claims 1, 2 or 3 wherein the iodine is at least initially a finely divided particulate.

5. An electrochemical cell comprising an anode and a cathode in operative relationship, the cathode comprising a combination consisting essentially of a conductive saturated liquid solution comprising first and second initial components and any reaction product thereof, the first initial component being an organic compound selected from the group of pyridine derivatives consisting of dimeric pyridine, monomeric substituted pyridines, dimeric substituted pyridines, monomeric quinoline, monomeric substituted quinolines, trimeric substituted pyridines, and mixtures thereof, and the second initial component being iodine dissolved therein.

6. The cell of claim 5 wherein an iodine solid phase is included with the saturated solution.

7. The cell of claim 5 or 6 wherein the molar ratio of iodine to pyridine rings in the organic compound in the saturated solution is on the order of at least about 3:1.

8. The electrochemical cell of claim 5 or 6 wherein at least at the operating surface of the anode consists essentially of lithium.

* * * * *

UNITED STATES PATENT AND TRADEMARK OFFICE
CERTIFICATE OF CORRECTION

PATENT NO. : 4,210,706
DATED : July 1, 1980
INVENTOR(S) : Paul M. Skarstad

It is certified that error appears in the above-identified patent and that said Letters Patent are hereby corrected as shown below:

Column 4, line 38, "2,506" should be --2.506--.

Signed and Sealed this

Second Day of September 1980

[SEAL]

Attest:

SIDNEY A. DIAMOND

Attesting Officer

Commissioner of Patents and Trademarks